United States Patent
Dahn et al.

(10) Patent No.: US 6,306,541 B1
(45) Date of Patent: Oct. 23, 2001

(54) ELECTRODES FOR LITHIUM ION BATTERIES USING POLYSILANES

(75) Inventors: Jeffery Raymond Dahn, Surrey; Alf M. Wilson, Vancouver; Weibing Xing, Burnaby, all of (CA); Gregg Alan Zank, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 645 days.

(21) Appl. No.: 08/661,532

(22) Filed: Jun. 11, 1996

(51) Int. Cl.$^7$ ...................................................... H01M 4/58
(52) U.S. Cl. ...................................... 429/218.1; 429/231.4
(58) Field of Search .................................. 429/218, 218.1, 429/231.4; 29/623.1

(56) References Cited

FOREIGN PATENT DOCUMENTS

| 582173 | 2/1994 | (EP) . | |
|---|---|---|---|
| 0 692 833 A1 | 1/1996 | (EP) | ............................... H01M/4/58 |

OTHER PUBLICATIONS

Xue et al. "An Epoxy–silane Approach to Prepare Anode Materials for Rechargeable Batteries". J. Electrochem. Soc., Sep. 1995.*

Xing, Weibing: "Pyrolysed pitch–polysilane blends for use as anode materials in lithium ion batteries", Solid State Ionics, vol. 93, No. 3–4, Jan. 1, 1997, pp. 239–244.

Noll, Chemistry and Technology of Silicones, Academic Press, 1968, p. 13.

* cited by examiner

Primary Examiner—Carol Chaney
(74) Attorney, Agent, or Firm—Sharon K. Severance; Roger E. Gobrogge

(57) ABSTRACT

A lithium ion battery electrode formed by the pyrolysis of a silane polymer followed by introducing lithium ions. These electrodes can be used to form batteries with large capacities, low irreversible capacity, high density and good safety behavior.

13 Claims, No Drawings

ELECTRODES FOR LITHIUM ION BATTERIES USING POLYSILANES

BACKGROUND OF THE INVENTION

The present invention relates to a method of forming electrodes for rechargeable lithium ion batteries and the electrodes formed thereby. These electrodes can be used to form batteries with high capacities.

Lithium ion batteries are known in the art and are widely used as electric sources for lap top computers, cellular phones, camcorders and the like. They are advantageous in that they can provide high voltage, high energy density, small self-discharge, excellent long-term reliability and the like.

Rechargeable lithium ion batteries have a simple mechanism. During discharge, lithium ions are extracted from the anode and inserted into the cathode. On recharge, the reverse process occurs. The electrodes used in these batteries are very important and can have dramatic effects on the batteries' performance.

Positive electrodes known in the art for use in these rechargeable lithium ion batteries include metal chalcogenides, metal oxides, conductive polymers and the like. Negative electrodes (anodes) known in the art for use in rechargeable lithium ion batteries include compounds in which the lithium ion is incorporated into a crystal structure of inorganic materials such as $WO_2$, $Fe_2O_3$ and the like, and carbonaceous materials such as graphite and conductive polymers.

Properties which are desirable in electrode materials include 1) chemical inertness towards the other battery components such as the lithium ions, the electrolyte salts and the electrolyte medium; 2) the ability to store high quantities of lithium; 3) the ability to reversibly store or bind the lithium; 4) lithium storage that minimizes formation of metallic lithium clusters or agglomerates and, thus, minimizes safety concerns; and 5) a high density which allows for volume efficiency.

The electrodes to date, however, have not maximized these properties. For instance, while lithium metal provides the best electrode potential, large batteries constructed therewith have poor safety behavior. Likewise, while lithium alloys have reasonable electrode potentials and safety profiles, they often crack and fragment with the constant cycling of the battery.

The most desirable anode materials to date have been carbonaceous compounds such as graphite. Graphite is chemically inert, can bind reasonable amounts of lithium (cells with capacities of about 330 mAh/g of anode) with little being irreversible (about 10%), and it has a high density (about 2.2 $g/cc^2$, although in the electrode the density is about 1.2 $g/cc^2$). Cells with larger capacities, however, are often desired. References which discuss the use of graphite anodes include Dahn et al.; Science, 270, 590–3 (1995), Zheng et al., Chemistry of Materials, 8, 389–93 (1996); Xue et al.; J. of Electrochem. Soc., 142, 3668 (1995), Wilson et al.; Solid State Ionics, 74, 249–54 (1994), Wilson et al.; J. of Electrochem. Soc., 142, 326–32 (1995) and Xue et al.; J. of Electrochem. Soc., 142, 2927 (1995).

It has recently been suggested that the addition of boron, phosphorous or metals such as silicon to carbonaceous anodes can increase the capacity of the resultant batteries. Such batteries, however, have not achieved optimal results.

For instance, Tahara et al. in European publication 582, 173 teach the use of a silicon oxide or a silicate as the negative electrode in a lithium ion battery. Similarly, Dahn et al. in European publication 685,896 teach the use of SiC containing materials as anodes in lithium ion batteries. These references, however, do not teach the methods or materials claimed herein.

The present inventors have now discovered that lithium ion batteries containing electrodes made from preceramic polysilanes can have many desirable properties heretofore unobtainable. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

SUMMARY OF THE INVENTION

The present invention relates to a method of forming an electrode for a lithium ion battery. The method comprises first pyrolyzing a silane polymer to form a ceramic material. Lithium ions are then incorporated into the ceramic material to form the electrode.

DETAILED DESCRIPTION OF THE INVENTION

The present invention is based on the unexpected discovery that lithium ion batteries containing anodes derived from polysilanes (also referred to as silane polymers) can provide the batteries with highly desirable properties. For instance, such batteries can have large capacities (the electrodes have the ability to store large quantities of lithium) with low irreversible capacity (the lithium is reversibly stored). In addition, these anode materials are chemically inert towards the other battery components, they minimize the agglomeration of lithium and they have a high density.

The electrodes of the present invention are formed from silane polymers. These polymers may contain units of general structure $[R^1R^2R^3Si]$, $[R^1R^2Si]$, and $[R^1Si]$ where each $R^1$, $R^2$ and $R^3$ is independently selected from the group consisting of hydrogen and hydrocarbons having 1–20 carbon atoms. The hydrocarbons include alkyl radicals such as methyl, ethyl, propyl etc., aryl radicals such as phenyl, and unsaturated hydrocarbon radicals such as vinyl. In addition, the above hydrocarbon radicals can contain hetero atoms such as silicon, nitrogen or boron. Examples of specific polysilane units are [$Me_2Si$], [PhMeSi], [MeSi], [PhSi], [ViSi], [PhMeSi], [MeHSi], [MeViSi], [$Ph_2Si$], [$Me_2Si$], [$Me_3Si$], and the like.

The polysilanes of this invention can be prepared by techniques well known in the art. The actual method used to prepare the polysilanes is not critical. Suitable polysilanes may be prepared by the reaction of organohalosilanes with alkali metals as described in Noll, *Chemistry and Technology of Silicones*, 347–49 (translated 2d Ger. Ed., Academic Press, 1968). More specifically, suitable polysilanes may be prepared by the sodium metal reduction of organo-substituted chlorosilanes as described by West in U.S. Pat. No. 4,260,780 and West et al. in Polym. Preprints, 25, 4 (1984), both of which are incorporated by reference. Other suitable polysilanes can be prepared by the general procedures described in Baney, et al., U.S. Pat. No. 4,298,559 which is incorporated by reference.

The polysilane may also be substituted with various metal groups (i.e., containing repeating metal-Si units). Examples of suitable metals to be included therein include boron, aluminum, chromium and titanium. The method used to prepare said polymetallosilanes is not critical. It may be, for example, the method of Chandra et al. in U.S. Pat. No. 4,762,895 or Burns et al. in U.S. Pat. No. 4,906,710, both of which are incorporated by reference.

It should be noted that the term polysilane as used herein is intended to include copolymers or blends of the above polysilanes and other polymers which are also useful herein. For instance, copolymers of polysilanes and silalkylenes [$R^1R^2Si\,(CH_2)nSiR^1R^2O$] (eg., silethylene), silarylenes (eg., silphenylene [$R^1R^2Si\,(C_6H_4)nSiR^1R^2O$]), siloxanes [$R^1R^2SiO$], silazanes, organic polymers and the like can be used herein, wherein $R^1$ and $R^2$ are as defined above. Moreover, blends of polysilanes and the above mentioned polymers are also useful herein. Finally, sugars which are modified with polysilanes are also contemplated and useful herein.

Generally, the silane polymer should be capable of being converted to ceramic materials with a ceramic char yield greater than about 20 weight percent. However, those with higher yields, such as greater than about 30 weight percent, preferably greater than about 50 weight percent and more preferably greater than 70 weight percent, are often used.

The above polymers should generally provide a char with at least an excess of carbon (eg., >0.05 wt. % based on the weight of the char). Although not wishing to be bound by theory, it is thought that the excess carbon forms a continuous network for the lithium ions. Larger excesses of carbon (eg., >5 wt. %) are often preferred.

What is meant by "excess carbon" in this invention is the amount of free or excess carbon derived from the polysilane (i.e., that not bound to Si or O) during pyrolysis expressed as a weight percentage based on the weight of the char.

The amount of free carbon derived from the polysilane is determined by pyrolysis of the polymer to an elevated temperature under an inert atmosphere until a stable ceramic char is obtained. For purposes of this invention, a "stable ceramic char" is defined as the ceramic char produced at an elevated temperature (e.g., 700–1200° C.).

Both the ceramic yield and the silicon, oxygen, and carbon content of the stable ceramic char are then determined. Using a composition rule of mixtures, the amount of excess carbon in the stable ceramic char can be calculated (the amount of "excess carbon" in the char is calculated by subtracting the theoretical amount of carbon bound to silicon from the total carbon present). The amount of excess carbon thus calculated is normally expressed as a weight percent based on the weight of the char derived from the polysilane.

If the desired amount of free carbon cannot be incorporated into the polymer, an additional source of carbon may be added. Examples include elemental carbon, phenolic resin, coal tar, high molecular weight aromatic compounds, derivatives of polynuclear aromatic hydrocarbons contained in coal tar and polymers of aromatic hydrocarbons.

Generally, polysilanes which contain phenyl groups are preferred since they add to the free carbon in the ceramic chars. Polysilanes which contain vinyl groups are also preferred since vinyl groups attached to silicon provide a mechanism whereby the polymer can be cured prior to pyrolysis. Polysilanes where R is almost exclusively methyl or hydrogen are generally not suitable for use in this invention without other carbon additives as there is insufficient free carbon in the resulting ceramic char.

The compositions of this invention may also contain curing agents which are used to crosslink the polymer prior to pyrolysis. These curing agents may be activated by heating the green body containing the curing agent to temperatures in the range of 50–300° C. (i.e., the activation of a free radical precursor) or they may be crosslinked at room temperature. Additionally, conventional condensation type curing and curing agents may also be used herein.

Curing agents are well known in the art. Examples include free radical precursors such as organic peroxides (dibenzoyl peroxide, bis-p-chlorobenzol peroxide, bis-2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the polysilane. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The addition of other materials is also within the scope of this invention. For instance, it is within the scope of the invention to add fillers such as amorphous or ceramic powder (eg., colloidal silica, carbon etc.), solvents, surfactants or processing aids such as lubricants, deflocculants and dispersants.

The polysilane and any optional ingredients are often cured prior to pyrolysis to increase the char yield. Curing procedures are well known in the art. Generally, such curing can be carried out by heating the article to a temperature in the range of about 50 to 450° C., preferably in an inert atmosphere such as argon or nitrogen.

The polysilane is then pyrolyzeded in an inert atmosphere and/or under vacuum to a temperature of 700° C. or more. The preferred pyrolysis temperature is about 800 to 1400° C.

Inert atmospheres are used during pyrolysis to prevent oxygen incorporation into the ceramic, or loss of carbon through combustion. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr.

If desired, however, a reactive gas such as silane, methane, $H_2$, $O_2$, or $NH_3$ may be used to chemically change the composition of the ceramic from that derived by pyrolysis in an inert atmosphere.

Pyrolysis may be performed in any conventional high temperature furnace equipped with a means to control the furnace atmosphere. Such furnaces are well known in the art and many are commercially available.

The temperature schedule for pyrolysis has been found to be important in the present invention. Generally, heating temperatures should be at a rate less than about 50° C./minute and preferably less than about 10° C./minute.

The resultant ceramics contain silicon, carbon, oxygen, and/or hydrogen in a wide array of proportions, based on the composition of the polysilane. For instance, the material can have a composition of:

wherein x=0 to 4 and y=0 to 100. Although unaccounted for in this formula, hydrogen may also be present in small amounts (e.g., <5 wt. %)

Applicants have discovered, however, that ceramic materials of the composition:

wherein x=0 to 1.25, y=0.82 to 31 and x+y is greater than or equal to 0.82 and less than or equal to 31 produce electrodes with the ability to reversibly store high quantities of lithium.

As noted above, when these types of materials are used as electrodes in lithium ion batteries, they provide the batteries with many desirable properties. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

It is often preferred to process the ceramic material which results from the above pyrolysis into a powder form for use in the electrodes. This can be accomplished by techniques known in the art such as grinding, milling, spray drying and the like.

Alternatively, however, the polysilane can be molded into the desired shape before pyrolysis followed by heating to produce the shaped electrode. For instance, the polysilane can be polymerized to a gel particle and then pyrolyzed.

If a ceramic powder is used, it is often mixed with variety of conductive agents, diluents or binders to assist in forming the desired shape electrode. For instance carbon black conductive diluent, N-methylpyrrollidone, cyclohexanone, dibutylpthallate, acetone, or polyvinylidene fluoride binder, polytetrafluorethylene dispersed in water as a binder or ethylene propylene diene terpolymer dissolved in cyclohexanone as a binder are within the scope of the invention.

Finally, lithium ions are incorporated into the electrode. This can occur prior to insertion of the electrode into the battery by, for instance, physically incorporating the lithium in the silane polymer prior to pyrolysis or by mixing the lithium in the powdered ceramic material.

Preferably, however, the lithium ions are inserted after the electrode is inserted into the battery. At such time, the battery is merely "charged" by placing both the electrode of the invention and a counter electrode of, for instance, lithium transition metal oxide such as $LiCoO_2$ in a litium ion conductive non-aqueous electrolyte and then applying a current in a direction which allows incorporation of the lithium ion into the electrode of the invention.

The electrodes of the present invention can be used in any battery configuration. The preferred battery of the present invention is the conventional spiral wound type in which a cathode and anode separated by a porous sheet are wound into a "jelly roll".

The cathodes typically comprise a suitable cathode material as described in the prior at (eg., as lithiated metal oxides) applied on the surface of aluminum foil. This is often accomplished by forming a slurry of the cathode material and a binder and/or diluent and then depositing the slurry on the foil. The diluent is dried leaving a thin film of the cathode material on the foil.

Anodes are formed in the same manner as the cathode except that the ceramic of the present invention is used as the anode material and a copper foil is used in place of the aluminum foil.

As noted above, a porous sheet such as a polyolefin material is placed between the cathode and the anode and the composition is then rolled. This "jelly roll" is inserted into a conventional battery can and the can is sealed with a header and a gasket.

Before the can is sealed, an appropriate electrolyte is added to fill the pores in the porous sheet and in the electrode themselves and connections are made between the anode and cathode and the external terminals.

Those skilled in the art will understand that the type and amount of the battery components will be chosen based on component material properties and the desired performance and safety requirements of the battery. Also, the battery is generally electrically conditioned (recharged) during its manufacture.

Other configurations or components are possible. For instance, coin cells or a prismatic format are within the scope of the present invention.

The following non-limiting examples are provided so that one skilled in the art will more readily understand the invention.

I. Battery Testing

Laboratory coin cell batteries were used to determine electrochemical characteristics. These were assembled using conventional 2325 hardware and with assembly taking place in an argon filled glovebox. For purposes of analysis the experimental electrode materials were used opposite a lithium metal electrode in these coin cell batteries. A stainless steel cap and a special oxidation resistant case comprise the container and also serve as negative and positive terminals respectively. A gasket is used as a seal and also serves to separate the two terminals. Mechanical pressure is applied to the stack comprising the lithium electrode, separator, and the experimental electrode by means of a mild steel disk spring and a stainless disk. The disk spring was selected such that a pressure of about 15 bar was applied following closure of the battery. A 125 $\mu$m thick foil was used as the lithium electrode. Celgard® 2502 microporous polypropylene film was used as the separator. The electrolyte was a solution of 1M $LiPF_6$ salt dissolved in a solvent mixture of ethylene carbonate and diethyl carbonate in a volume ratio of 30/70.

Electrodes of experimental material were made using a mixture of the powdered ceramic material plus Super S (trademark of Ensagri) carbon black conductive diluent and polyvinylidene fluoride (PVDF) binder (in amounts of about 5 and 10% by weight respectively to that of the sample) uniformly coated on a thin copper foil. The powdered sample and the carbon black were initially added to a solution of 20% PVDF in N-methylpyrrollidone (NMP) to form a slurry with additional NMP added to reach a smooth viscosity. The slurry was then spread on pieces of copper foil using a small spreader, and the NMP evaporated at about 100° C. in air. Once the sample electrode was dried it was compressed between flat plates at about 25 bar pressure. Electrode squares, 1.44 cm², were then cut from the larger electrode. These electrodes were then weighed and the weight of the foil, the PVDF, and the carbon black were subtracted to obtain the active electrode mass.

After construction, the coin cell batteries were removed from the glove box, thermostated at 30±1° C., and then charged and discharged using constant current cyclers with a ±1% current stability. Data was logged whenever the cell voltage changed by more than 0.005 V. Currents were adjusted based on the amounts of active material and the desired test conditions. Normally currents of 18.5 mAh/g of active material were used.

Cells were normally discharged to 0.0 V and then charged to 3.0 V. This is the 'first cycle'. The cells were similarly cycled two more times in succession. The capacity of the first discharge is designated $Qd_1$, the capacity of the first charge by $Qc_1$, etc. The reversible capacity is taken here to be $Qrev=(Qc_1+Qd_2)/2$. The irreversible capacity s taken to be $Qirr=Qd_1-Qc_1$.

II. Materials

All polysilane materials were obtained from Dow Corning Corporation or Shin Nisso Kako Ltd. Pitch was obtained from Ashland Chemical or Crowley Chemical. Lupersol 101™ is 2,5-bis(t-butylperoxy)-2,3-dimethylhexane obtained from PennWalt Corp., Dicup "R"™ is dicumyl peroxide obtained from PennWalt Corp. and Pt#4 is an 8.6 wt. % solution of platinum in 1,3-divinyl-1,1,3,3-tetramethyldisiloxane.

Polymer pyrolysis was carried out in a Lindberg Model 54434 or similar tube furnace equipped with Eurotherm temperature controllers. In a typical pyrolysis a sample was weighed out (approximately 4.0 grams) and placed in an alumina boat and loaded into the furnace. The furnace was then purged with argon at a rate sufficient to achieve one turnover of the furnace atmosphere every 3 minutes. After purging 45 to 60 minutes the flow was reduced to allow for a turnover every 6 minutes and the temperature raised to a final temperature and held 60 minutes. The ceramic sample was then reweighed, and ground for testing and analysis.

III. Analysis

Solution NMR spectra were recorded on a Varian VXR400S or Varian 200 MHz instrument. Gel permeation chromatographic data were obtained on a Waters GPC equipped with a model 600E systems controller, model 410 differential refractometer detector interfaced to a Compaq 486/33 computer employing PE Nelson Turbochrom software; all values are relative to polystyrene standards. Thermal gravimetric analysis were recorded on an Omnitherm TGA 951 analyzer interfaced to an IBM PS/2-50 Z computer with Thermal Sciences software. Carbon, hydrogen and nitrogen analysis were done on a Perkin Elmer 2400 analyzer. Oxygen analysis were done on a Leco oxygen analyzer model RO-316 equipped with an Oxygen determinator 316 (Model 783700) and an Electrode furnace EF100. Silicon analysis was determined by a fusion technique which consisted of converting the solid to a soluble form and analyzing the solute for total silicon by Arl 3580 ICP-AES analysis.

The x-ray powder diffraction was carried out on a Siemens D5000 horizontal theta-theta automated goniometer, equipped with a sample spinner, low background sample holders, graphite monochromator, scintillation counter, long fine focus Cu tube, and computer controlled operation. The solid sample is ground to a fine powder of −100 mesh & smaller without any grit feeling by using a boron carbide grinder to minimize the contamination from grinding. Scans are made at 1 degree 2-theta per minute from 6 to 80 2-theta with the x-ray tube operated at 40 kV & 30 mA.

IV. EXAMPLES

Example 1 and 2

Example 1 Polymer PSS-120™. This material was a polysilane prepared from the sodium coupling of a mixture of phenylmethyldichlorosilane and dimethylsilane. It was purchased from Shin Nisso Kako co. Ltd. tradename PSS120™.

Example 2 Polymer PSS-400™. This material was a polysilane prepared from the sodium coupling of a mixture of phenylmethyldichlorosilane and dimethylsilane. It was purchased from Shin Nisso Kako co. ltd. tradename PSS400™.

Pyrolysis An aliquot of the polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. PSS-120™: Yield-24.4%; 49.6%C; 0.23%H; 40.3%Si. PSS-400™: Yield: 79.3%; 43.6%C; 0.27%H; 48.8%Si.

Battery Cell Testing An aliquot of the ceramic material was made into an electrode as described above and assembled into a test cell as described above. Pyrolysis Rate: 5° C./ min.; PSS-120™: Reversible Capacity: 341 mAh/g; Irreversible Capacity: 186 mAh/g; average charge voltage 0.72 V. PSS-400™: Reversible Capacity: 364 mAh/g; Irreversible Capacity: 246 mAh/g; average charge voltage 0.77 V.

Examples 3–13

Polymer Synthesis (Ex 3). In a 150 mL flask equipped with a magnetic stirring bar was placed 26 g of pitch (Ashland Chemical A-240) dissolved in 75 mL of THF under argon. To this was added 0.1 mL of a Pt #IV solution. Over a 30 minute period $HSiCl_3$ (13.5 g, 0.1 mole) was added to the stirred solution. This mixture was then heated to 65° C. for 48 h. The polymeric product was isolated by filtration and removal of the solvent by rotary evaporation. This material was not treated or heated for cure any further prior to pyrolysis.

Polymer Synthesis (Ex 4–13). These materials were made by blending the following polymers with pitch in 250 g THF containing 1% by weight Lupersol $_{101}$™ (0.5 g). The solid blends were then isolated by removal of the solvent by rotary evaporation, and then crosslinked by heating to 200° C. for 30 minutes under argon. The amounts of the materials used in these blends are shown in Table 1.

TABLE 1

| Ex No | Wt. of Pitch (g) | Wt. of Polymer (g) | |
|---|---|---|---|
| 4 | 25 | 25 | PSS 120 |
| 5 | 37.5 | 12.5 | PSS 120 |
| 6 | 12.5 | 37.5 | PSS 120 |
| 7 | 42.85 | 7.15 | PSS 120 |
| 8 | 45 | 5 | PSS 120 |
| 9 | 25 | 25 | PSS 400 |
| 10 | 37.5 | 12.5 | PSS 400 |
| 11 | 12.5 | 37.5 | PSS 400 |
| 12 | 42.85 | 7.15 | PSS 400 |
| 13 | 45 | 5 | PSS 400 |

Pyrolysis An aliquot of the polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 2.

TABLE 2

Ceramic Conversion

| Ex | Ceramic Yield | % C | % H (percent by weight) | % Si | % O | XRD* |
|---|---|---|---|---|---|---|
| 3 | 41.4 | 94.0 | 0.77 | 2.1 | | G |
| 4 | 35.4 | 76.8 | 0.53 | 16.7 | 4.3 | G & SiC |
| 5 | 26.4 | 85.6 | 0.64 | 8.7 | | |
| 6 | 27.4 | 67.9 | 0.46 | 24.2 | | |
| 7 | 37.2 | 90.9 | 0.76 | 4.3 | | |
| 8 | 42.0 | 90.9 | 0.71 | 1.8 | | |
| 9 | 60.2 | 63.5 | 0.44 | 26.7 | 9.7 | G & SiC |
| 10 | 55.0 | 77.3 | 0.56 | 13.4 | | |
| 11 | 69.2 | 52.9 | 0.34 | 25.1 | | |
| 12 | 43.6 | 82.0 | 0.68 | 9.2 | | |
| 13 | 44.4 | 87.9 | 0.78 | 6.2 | | G & O |

*O indicates a silica glass XRD pattern with broad reflections centered at 24° and 68° 2 theta.
G indicates a graphene pattern with a broad reflection centered at about 44 degrees 2 theta.
SiC indicates a SiC pattern with sharp reflection centered at about 36 and 44 degrees 2 theta.

Battery Cell Testing An aliquot of the ceramic material was made into an electrode as described above and assembled into a test cell as described above. The results are summarized in Table 3.

TABLE 3

Battery Testing

| Ex No | Pyrolysis Rate (° C./min) | Reversible Capacity (mAh/g) | Irreversible Capacity (mAh/g) | Avg Charge Voltage | Avg Discharge Voltage |
|---|---|---|---|---|---|
| 3 | 5.0 | 364 | 246 | 0.77 | 0.3 |
| 4 | 5.0 | 543 | 138 | 0.67 | 0.34 |
| 5 | 5.0 | 470 | 210 | 0.8 | 0.34 |
| 6 | 5.0 | 520 | 180 | 0.96 | 0.34 |
| 7 | 5.0 | 340 | 200 | 0.77 | 0.36 |
| 8 | 5.0 | 350 | 150 | 0.76 | 0.35 |
| 9 | 5.0 | 566 | 182 | 0.79 | 0.36 |
| 10 | 5.0 | 550 | 197 | 0.85 | 0.38 |
| 11 | 5.0 | 640 | 270 | 0.90 | 0.34 |
| 12 | 5.0 | 450 | 210 | 0.86 | |
| 13 | 5.0 | 440 | 120 | 0.87 | |

Examples 14–15

Example 14 In a 500 mL flask was placed 25 g of Phenolic Resin (Georgia Pacific) dissolved in 125 mL of tetrahydrofuran. To this was added 25 g of polysilane PSS400™ as a solution in 125 mL tetrahydrofuran. This mixture was then sonicated with a 400 W sonicator for 15 minutes. The polymeric product was isolated by filtration and the solvent was removed by rotary evaporation. This product was not treated or heated for cure prior to pyrolysis.

Example 15 In a 500 mL flask was placed 25 g of Phenolic Resin (Varcum 29-353) dissolved in 125 mL of tetrahydrofuran. To this was added 25 g of polysilane PSS400™ as a solution in 125 mL tetrahydrofuran. This mixture was then sonicated with a 400 W sonicator for 15 minutes. The polymeric product was isolated by filtration and the solvent was removed by rotary evaporation. This product was not treated or heated for cure prior to pyrolysis.

Pyrolysis An aliquot of the above polymers (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 4.

TABLE 4

Ceramic Conversion

| Ex | Ceramic Yield | % C | % H (percent by weight) | % Si | % O | XRD* |
|---|---|---|---|---|---|---|
| 14 | 78.5 | 50.1 | 0.37 | 32.6 | | G & O |
| 15 | 70.9 | 56.7 | 0.38 | 23.5 | | G & O |

*O indicates a silica glass XRD pattern with broad reflections centered at 24° and 68° 2 theta.
G indicates a graphene pattern with a broad reflection centered at about 44 degrees 2 theta.

Battery Cell Testing An aliquot of the ceramic material was made into an electrode as described above and assembled into a test cell as described above. The results are summarized in Table 5.

TABLE 5

Battery Testing

| Ex No | Pyrolysis Rate (° C./min) | Reversible Capacity (mAh/g) | Irreversible Capacity (mAh/g) | Avg Charge Voltage |
|---|---|---|---|---|
| 14 | 5.0 | 600 | 260 | 0.96 |
| 15 | 5.0 | 620 | 270 | 0.98 |

Examples 16–19

Silane Modified Sugars

Synthesis. Chlorosilanes were mixed with aqueous solutions of sugar (100 g sucrose in 100 g water) and stirred for 24 h. The reaction mixtures were then heated to 300° C. over a 24 h period to form a gel and begin the decomposition of the mixture. The reactants used in each of these materials are listed in Table 6.

TABLE 6

| Ex No | Chlorosilane | Wt. of Chlorosilane (g) |
|---|---|---|
| 16 | SiCl4 | 25.5 |
| 17 | MeSiCl3 | 22.4 |
| 18 | Me2SiCl2 | 19.3 |
| 19 | Me3SiCl | 16.3 |

Pyrolysis An aliquot of the dried gel (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 7.

TABLE 7

Ceramic Conversion

| Ex | Ceramic Yield | % C | % H (percent by weight) | % Si | % O | XRD* |
|---|---|---|---|---|---|---|
| 16 | 53.3 | 66.9 | 0.6 | 13.8 | | G & O |
| 17 | 54.1 | 73.8 | 0.1 | 12.3 | | G & O |

TABLE 7-continued

Ceramic Conversion

| Ex | Ceramic Yield | % C | % H | % Si | % O | XRD* |
|----|---------------|------|------|------|------|------|
|    |               | (percent by weight) | | | | |
| 18 | 45.7 | 94.8 | 0.8 | 1.2 | | G |
| 19 | 51.3 | 96.1 | 0.9 | 0.6 | | G |

*O indicates a silica glass XRD pattern with broad reflections centered at 24° and 68° 2 theta.
G indicates a graphene pattern with a broad reflection centered at about 44 degrees 2 theta.

Battery Cell Testing An aliquot of the ceramic material was made into an electrode as described above and assembled into a test cell as described above. The results are summarized in Table 8.

TABLE 8

Battery Testing

| Ex No | Pyrolysis Rate (° C./min) | Reversible Capacity (mAh/g) | Irreversible Capacity (mAh/g) | Avg Charge Voltage | Avg Discharge Voltage |
|-------|---------------------------|------------------------------|-------------------------------|--------------------|-----------------------|
| 16 | 5.0 | 550 | 400 | 1.18 | 0.31 |
| 17 | 5.0 | 400 | 250 | 0.76 | 0.27 |
| 18 | 5.0 | 320 | 130 | 0.66 | 0.32 |
| 19 | 5.0 | 310 | 120 | 0.67 | 0.33 |

Examples 20–22

An aliquot of the materials listed in Table 9 (ca. 4 g) was placed in a graphite crucible and heated under a continuous argon purge at 5° C./min to 1100° C. and held at temperature for one hour before cooling to ambient temperature. The ceramic yield was calculated and the ceramic material made into an electrode as described above and assembled into a test cell as described above. The results are summarized in Table 9.

TABLE 9

| Ex No | Polymer | Char Yield | Rev Cap | Irr Cap | Avg Chg V |
|-------|---------|------------|---------|---------|-----------|
| 20 | Ex 9 | 59.6 | 540 | 180 | 0.76 |
| 24 | Ex 6 | 30.5 | 500 | 160 | 0.68 |
| 22 | Ex 11 | 67.1 | 510 | 230 | 0.79 |

Examples 23–24

An aliquot of the materials listed in Table 10 (ca. 4 g) was placed in a graphite crucible and heated under a continuous argon purge at 5° C./min to 800° C. and held at temperature for one hour before cooling to ambient temperature. The ceramic yield was calculated and the ceramic material made into an electrode as described above and assembled into a test cell as described above. The results are summarized in Table 10.

TABLE 10

| Ex No | Polymer | Char Yield | Rev Cap | Irr Cap | Avg Chg V | Avg Dischg V |
|-------|---------|------------|---------|---------|-----------|--------------|
| 23 | Ex 6 | 34 | 620 | 360 | 1.17 | 0.36 |
| 24 | Ex 11 | 75 | 620 | 380 | 1.18 | 0.27 |

That which is claimed is:

1. A method of forming an electrode material for a lithium ion battery comprising:

(A) pyrolyzing a composition comprising a polysilane to form a ceramic material; and (B) introducing lithium ions into the ceramic material to form an electrode material.

2. The method of claim 1 wherein the composition comprising the polysilane is cured prior to pyrolysis.

3. The method of claim 1 wherein the composition comprising the polysilane is pyrolyzed at a temperature in the range of 700 to 1400° C. at a rate of heating less than about 10° C./minute.

4. The method of claim 1 wherein the ceramic material is formed into a powder, the powder blended with a binder and a diluent to form a mixture and the mixture formed into the shape of an electrode before the lithium ions are introduced.

5. The method of claim 1 wherein pyrolysis of the polysilane produces a ceramic material containing at least 5 weight percent excess carbon.

6. The method of claim 1 wherein the polysilane has a char yield of greater than about 50 weight percent.

7. The method of claim 1 wherein the composition comprising the polysilane also contains a curing agent.

8. The method of claim 1 wherein the composition comprising the polysilane also contains a carbonaceous material.

9. The method of claim 1 wherein the composition comprising the polysilane also contains a filler.

10. The method of claim 1 wherein the polysilane is a copolymer with a polymer selected from the group consisting of silalkylenes, silarylenes, siloxanes, silazanes, and organic polymers.

11. The method of claim 1 wherein the polysilane is blended with a polymer selected from the group consisting of silalkylenes, silarylenes, siloxanes, silazanes, and organic polymers.

12. The method of claim 1 wherein the silane is a sugar modified with a polysilane.

13. In a method of making a rechargeable lithium ion battery, the improvement comprising making an anode by a process comprising:

(A) pyrolyzing a composition comprising a polysilane to form a ceramic material; and (B) introducing lithium ions into the ceramic material to form an anode.

* * * * *